United States Patent [19]

Crostack

[11] Patent Number: 4,803,428
[45] Date of Patent: Feb. 7, 1989

[54] METHOD AND APPARATUS FOR NON-DESTRUCTIVE MATERIAL TESTING, PARTICULARLY FOR DETERMINATION OF THICKNESS OF COATING LAYERS ON A BASE MATERIAL BY MEASURING ELECTRICAL CONDUCTIVITY OR MAGNETIC PERMEABILITY AT THE FINISHED SPECIMEN

[76] Inventor: Horst-Artur Crostack, Beringweg 2, 5860 Iserlohn, Fed. Rep. of Germany

[21] Appl. No.: 2,865

[22] Filed: Jan. 13, 1987

[51] Int. Cl.[4] .................. G01B 7/10; G01R 33/12; G01N 27/72
[52] U.S. Cl. .................. 324/230; 324/202; 324/226; 324/227; 427/8; 364/563
[58] Field of Search .............. 324/226, 229, 230, 231, 324/260, 227, 202; 118/689, 690, 691; 427/8, 9, 10; 73/1 J; 364/563, 571

[56] References Cited

U.S. PATENT DOCUMENTS 4,530,851  7/1985  Shannon et al. .................. 118/689

Primary Examiner—Gerald R. Strecker
Assistant Examiner—Walter E. Snow
Attorney, Agent, or Firm—Toren, McGeady & Associates

[57] ABSTRACT

A method and apparatus for the determination of thickness of plastic materials, as well as of bonding and coating materials, by high frequency electric and magnetic alternating fields. The method enables a simple test of components, as well as of coatings and bondings, even if the plastic parts to be tested or the coatings or bondings to be tested are not yet completely cured and the surfaces to be tested are located, so as to be concealed or are accessible only with difficulty. The method and apparatus consists in that electrically conductive or ferromagnetic particles are added to the materials to be measured and subsequently the electrical conductivity or magnetic permeability is measured at the completed or coated test specimen by high-frequency electrical and magnetic alternating fields, whose progression in space and time is adapted to the measuring task.

13 Claims, 1 Drawing Sheet

METHOD AND APPARATUS FOR NON-DESTRUCTIVE MATERIAL TESTING, PARTICULARLY FOR DETERMINATION OF THICKNESS OF COATING LAYERS ON A BASE MATERIAL BY MEASURING ELECTRICAL CONDUCTIVITY OR MAGNETIC PERMEABILITY AT THE FINISHED SPECIMEN

BACKGROUND OF THE INVENTION

1. Field of the Invention

The invention is directed to a method and apparatus for non-destructive testing of materials, and, in particular, for the determination of the thickness of plastics, as well as of bonding and coating materials, by means of high frequency electrical or magnetic alternating fields. The principal area of application of the invention is the testing of plastic components, as well as the determination and monitoring of the thickness of coatings and bonding layers. The invention is however not limited to this area only, rather it can be used in any other sphere, in which the known thickness measuring methods cannot lead to satisfactory results because of reasons described below.

2. Description of the Prior Art

Various techniques are known for determining the thickness of plastic parts, coatings and bonding layers, which techniques differ depending upon the type of part or material to be tested, and which lead to different results depending upon the purpose of the tests.

A. Testing of Plastic Parts

In the fabrication of plastic parts, particularly of endless reel parts such as pipes, foils and the like, variations in the thickness thereof occur because of non-uniformities in the production process. These variations in thickness are difficult to measure non-destructively, so that plastic components (for instance, shopping bags) are greatly limited in their overall strength because of the existing weak spots.

B. Testing of Coatings on Accessible Sides

1. Optical Methods:

These can be utilized for thickness testing of transparent coatings and bonding layers applied to metallic or plastic materials. They are based either upon the detection and evaluation of the interferences produced or upon an evaluation of the optical effect of a concentration of the coating or bonding material with optically visible particles. The thickness of the layer can indeed be largely determined with these optical methods, however the scope of their utilization is very limited, since they are only usable for transparent materials of very thin layers.

2. Test by Means of Measuring Probes:

These methods are based upon placing a measuring probe upon the layer whose thickness is to be determined, and measuring and evaluating the current or voltage profile of the field of the probe for determination of the distance between measuring probe and the base material, from which one can deduce the thickness of the layer applied to the base material. This method is, however, only utilized for coating materials which are non-conductive or do not exhibit any magnetic properties. A prerequisite for the utilization of these processes is that the coating must be cured prior to measurement, because otherwise, the probes could not be placed upon it. Furthermore, the coating must be applied to an accessible side or spot. If this is not the case, which is entirely possible in the automatic coating and production processes presently being used, these methods fail completely.

C. Testing Coatings on Inaccessible Sides

If the coating has been applied to a side which is inaccessible, then information about the thickness of the coating can only be acquired by enriching of the adhesive with radioactive particles or heavy metals and subsequently measuring the radioactive emissions. These methods, however, require not only considerable expense but also special protection measures. Therefore, they cannot be used in many cases. The same applies for measurement by means of neutron beams. In this way, the thickness of a coating from organic materials can indeed be determined based on electrically and magnetically conducting components, however the appropriate measures (relatively high neutron flow, protection) are relatively costly. Apart from that, the measuring accuracy is also impaired if the composition (material thickness) of the base material located beneath the coating, is not exactly known.

SUMMARY OF THE INVENTION

The object of the invention is to provide a method and apparatus in which a simple test of components, as well as of coatings and bondings is possible even if the plastic part or the coating or bonding to be tested is not yet cured and the surfaces to be tested are located so as to be concealed or are practically inaccessible. Furthermore, the invention is directed to plastic components or coated components produced by means of this method or apparatus.

The invention includes adding electrically conductive or ferromagnetic particles to the material to be measured so as to constitute a relatively minor volume share thereof, and thereupon measuring the electrical conductivity or magnetic permeability of the finished or coated test specimen by means of high frequency electrical and magnetic alternating fields; the progression of these alternating fields as to space and time is adjusted, based on the measuring task.

BRIEF DESCRIPTION OF THE DRAWINGS

With the above and additional objects in mind, as will hereinafter appear, the invention will be described with reference to the accompanying drawings, in which.

DESCRIPTION OF THE PREFERRED EMBODIMENT

In performing the method according to the invention, initially the plastic, bonding or coating material to be used is impregnated with electrically conductive or ferromagnetic particles, wherein the relative volume share of the particles is kept low. This impregnation is performed in differing fashions, depending upon the measurement task. If pure plastics are to be tested, be it as a material for plastic parts or as a base material of plastic parts, which are to be coated with bonding or coating material, or coatings or layers on non-conductive or non-ferromagnetic base materials, the added particles predominately consist of purely electrically conductive, non-ferromagnetic materials, such as, for instance, aluminum, copper or austenitic steels. Also noble metals can be considered depending on the compatibility with the coating material and, in particular, with the base material to be coated. If electrically conductive metals, such as, for instance, aluminum or austenitic steels, are to be coated, magnetic particles are added to the coating or bonding material.

The size and the volume share of the added particles depends upon the expected spacing between the measuring probe and the layer to be measured and is predetermined in accordance with the measuring task. Usually, particle concentrations will lie substantially below 10% of the overall volume of the material.

Figure 1:
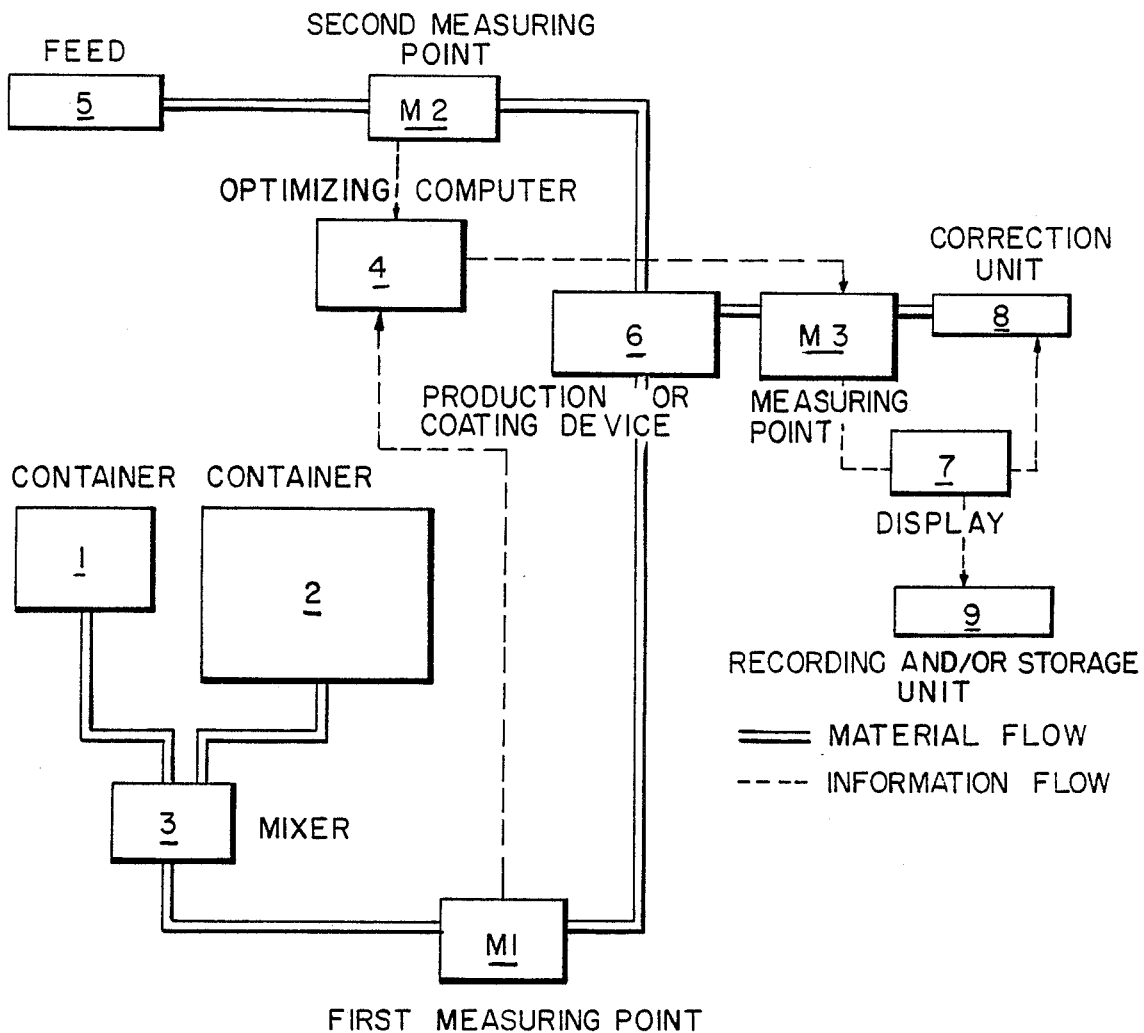
FIG. 1 is a block flow diagram of an apparatus for thickness measurement of a plastic-bonding coating on a base material, for example, an electrically conducting plate, by means of the method according to the invention.

As shown in the FIG. 1, the plastic material or the coating material is directed from a container 1 into a mixer 3, where the appropriate additive material of measuring particles (exhibiting either electrical conductivity or magnetic permeability) supplied from a container 2 is admitted to it. A mixing process in the mixer 3 follows, which, as a rule, is assisted by mechanical stirring or agitation in order to achieve as homogeneous a distribution of the measuring particles as possible.

After the mixing process, the impregnated material is passed through a first measuring point M1. At this measuring point M1, the homogeneity of the (coating) material and the concentration of the particles therein are determined by measuring the electrical conductivity or the magnetic permeability thereof. This occurs by examining with a broad band pulse, as far as amplitude and phase spectrum are concerned, which pulse is introduced into the material by a probe. Scanning and sweep, as well as segmented coils of differing geometry can be utilized as probes. The current or voltage level developed in the coil, or through secondary coils in the vicinity under the influence of the electrical conductivity or the magnetic permeability of the material to be measured, is determined and evaluated for generating a signal, the value of which being indicative of the particle concentration and the variation of which, over time, being a measure of the homogeneity of the mixture.

This signal supplied by the measuring point M1 is used as a first calibrating signal for the high frequency electrical and magnetic alternating field to be used for the thickness measurement, in order to adapt its magnitude and progression in space and time during the thickness measurement of the test specimen to the concentration in, and homogeneity of, the material to be measured. This is accomplished by a computer 4, to which the calibrating signal produced by the measuring point M1 is supplied and which has the task of optimizing the thickness measuring pulse with the help of the data supplied to it.

If the materials to be coated are metallic, and possibly conductive in nature, or, in the alternative, have a residual magnetic field, then the base material, supplied by feed 5, for example a sheet metal feed, is examined at a second measuring point M2 also with a broad band test pulse as far as amplitude and phase spectrum are concerned, this measurement occurs in parallel with the measurement at the measuring point M1. With such base materials, generally magnetic particles will serve as the additive materials (in container 2). Since the magnetic particles can vary in their concentration, as well as in their spacing (sheet metal thickness), and since these two effects are not separable by signal analysis, to begin with, the thickness of the part to be coated, for instance, of the sheet material, has to be determined, which occurs at the measuring point M2, by determining the effect of the electrical conductivity or the magnetic permeability of the base material on the current or voltage profile of the test pulse and by utilizing same for generating of a signal whose progression in space and time corresponds to the material composition or thickness of the base material. Thus, a second calibration signal is produced by the measuring point M2, which is used by the computer 4 to further adapt the thickness measuring pulses to the composition and thickness of the base material. For this purpose, the second calibration signal is also supplied to the optimizing computer 4. This computer 4 calculates an optimized thickness measuring pulse from the predetermined homogeneousness or particle concentration in the impregnated material to be measured, in the case, a coating material, and also from the predetermined material composition or thickness of the base material. This optimized thickness measuring pulse has the particular task to reduce possible spacing or so-called lift off effects, as well as disturbance variables which can occur in production.

If the base material is pure plastic or is a non-conductive and non-magnetic material, the generation of the second calibration signal, which corresponds to the material composition or thickness of the base material, can be omitted, since a corresponding adaptation of the thickness measuring pulse therefor is not required. The second measuring point M2 is therefore unnecessary for the measurement of the thickness of pure plastic components or coatings on non-conductive and non-ferromagnetic materials.

The measurement at the measuring point M2 can also occur by means of a probe, whose measuring data, constituting the second calibrating signal, are chronologically assigned. The test pulses at the measuring points M1 and M2 are timewise short pulses, which are produced in a manner so that a coil is excited with one or several computer determined oscillations of predeterminable length and shape, with respectively selected amplitude and phase spectrum. The excitation oscillations for the coil originate from a memory programmed by the computer.

The first and second calibrating signals are analyzed in the optimizing computer 4 and compared with a predetermined desired value for each calibration curve. The differential values are used to set up the parameters of timewise short pulses with predeterminable frequency (amplitude and phase) spectrum, which originate from a memory programmed by the computer 4, and are changeable as far as length and shape is concerned. The signal obtained in such a manner is used as an excitation signal for a (probe) coil, in order to produce a measuring pulse in said coil adapted to the measuring task, through whose alternating field, the test specimen is made to pass a measuring point M3 after having passed through the measuring points M1 and M2, and having been finished, produced or coated in a production or coating device 6.

Herein, the effect of the electrical conductivity or of the magnetic permeability of the test specimen material, which is to be measured, upon the current or voltage profile of the eddy current measuring pulse, is determined and evaluated for determination of the thickness of the test specimen coating to be measured or, in the case of pure plastic components, of the thickness of the test specimen wall, and for the determination of possible defects in the coating. The measured value is displayed in a display 7 and, depending upon the production process, fed to a correction line 8, in order to initiate corrective measures in the production or coating device 6.

Figure 2:
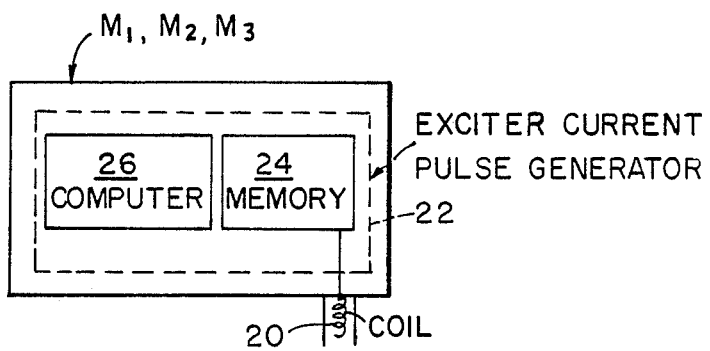
FIG. 2 is a block diagram of one of the measuring points of FIG. 1.

As shown in FIG. 2, each of the measuring points M1, M2 and M3 may include a measuring coil 20 having an exciter current pulse generator 22, which includes a memory 24 programmed by a computer 26, which generates chronologically short pulses of predeterminable frequency spectrum, with respect to amplitude and phase, which are changeable in length and shape.

Essential advantages of the method according to the invention consist, apart from the rapidity of the test, additionally, in that:

(1) it is universally usable for the determination of the thickness of plastic components, as well as of coatings on metallic or plastic base material;

(2) the thickness of plastic coatings can be determined at inaccessible regions of components;

(3) materials which have not as yet been cured can be tested;

(4) the determination can occur also in a liquid state of the coating material, so that possibly corrective measures can be taken; and (5) at the same time, disturbance variables can be taken into account or eliminated by means of the specially adapted eddy current pulses.

The measured value can be recorded or stored in a recording and/or storage unit 9, for measurements to be repeated later.

Numerous alterations of the structure herein disclosed will suggest themselves to those skilled in the art. However, it is to be understood that the present embodiment is for purposes of illustration only, and not to be construed as a limitation of the invention. All such modifications which do not depart from the spirit of the invention are intended to be included within the scope of the appended claims.

What is claimed is:

1. A method for non-destructively determining the thickness of pieces and layers of plastic components, as well as bonding and coating layers on a base material by measuring the electrical conductivity or magnetic permeability at a finished or coated test specimen by means of high-frequency electrical or magnetic alternating fields, characterized in that the method comprises in combination:

adding electrically conductive or ferromagnetic particles to the material to be measured, said particles constituting relatively minor volume shares thereof;

measuring the electrical conductivity or magnetic permeability of the material treated with particles prior to its fabrication processing by examination, by means of generated broad band test pulses, with respect to amplitude and phase, of the current or voltage profile development of said test pulses under the influence of the electrical conductivity or magnetic permeability and the geometry of the measured material being determined; and using the values characteristic of said development for generating a calibration signal for optimizing an alternating field for measuring the thickness of the finished or coated test specimen, by setting up the parameters of measuring pulses with predeterminable frequency (amplitude and phase) spectrum generated by said alternating field for the final thickness measurement, the chronological and spatial progression of said calibration signals occur corresponding to the homogeneousness and particle concentration of the material to be measured; and subjecting said specimen to said measuring pulses for measuring the thickness thereof.

2. The method according to claim 1, characterized in that the method further comprises:

determining the thickness and composition of the base material by measuring its electrical conductivity or magnetic permeability when testing coatings are to be applied to electrically conductive or magnetic base materials by examining, by means of broad band test pulses with respect to amplitude and phase generated by one of said alternating fields, current or voltage profile development of said test pulses under the influence of the electrical conductivity or magnetic permeability and the geometry of the measured material being determined; and using the values characteristic of said development for generating a calibration signal for further optimizing the alternating field for the thickness measurement of the finished or coated test specimen by additionally setting up the parameters of the measuring pulses with predeterminable frequency spectrum generated by said alternating field for the final thickness measurement, the chronological and spatial progression of said calibration signals or curves corresponding to the composition and thickness of the base material to be coated.

3. The method according to claim 2, characterized in that the method comprises chronologically feeding the calibration signals to a computer or adjusting the measuring pulses for the final thickness measurement with the aid of the data which have been stored in said computer.

4. The method according to claim 3, characterized in that the test pulses are produced as chronologically short pulses by exciting a probing coil for the measurement of the electrical conductivity or magnetic permeability with a previously calculated oscillation or with several of such oscillations of predetermined length and shape with respectively selected amplitude and phase spectra.

5. The method according to claim 4, characterized in that the measuring pulses for the final thickness measurement are produced by exciting a probing coil with test pulses, the parameters of pulse shape and length of which are set up by the calibration signals.

6. The method according to claim 5, characterized in that the method further comprises analyzing and comparing calibration signals with predetermined desired values for each calibration signal and using the thus obtained limited values as correction values for the optimization of the measuring pulses for the final thickness measurement.

7. An apparatus for non-destructively determining the thickness of pieces and layers of plastic components, as well as bonding and coating layers on a base material having means for determining the electrical conductivity or magnetic permeability of the finished or coated test specimen by using high-frequency electrical or magnetic alternating fields, characterized in that said apparatus comprising in combination:

a first container for supplying said plastic or bonding or coating material;

a second container for supplying electrically conductive or ferromagnetic particles;

a mixer for mixing said particles into said material;

means for processing said material impregnated with said particles for forming a test specimen;

a measuring point (M1) located after the mixer for measuring the electrical conductivity or magnetic permeability of the particle impregnated material prior to being processed by means of broad band test pulses, as far as amplitude and phase spectrum are concerned, generated by said alternating field; and an optimizing unit to which the measuring data output of the measuring point (M1) is fed which generates one or more calibration signals or calibration curves, said signals or curves being fed to the said determining means for the finished or coated test specimen for optimizing the alternating field for the final thickness measurement, wherein said determining means comprises means for setting up the parameters of measuring pulses with predeterminable frequency (amplitude and phase) spectrum generated by the alternating field for the final thickness measurement in accordance with the calibration signal or calibration curves.

8. The apparatus according to claim 7, for the test or monitoring of bonding or coating layers on a base material, which includes means for applying the base material and means for applying said particle impregnated material to said base material as coating thereon, characterized in that said apparatus further comprises a measuring point (M2) located after the base material supplying means for measuring the electrical conductivity or magnetic permeability of the base material prior to being coated, by means of broad band test pulses, as far as amplitude and phase spectrum are concerned, generated by said high frequency electrical or magnetic alternating fields, measuring data therefrom being applied to a control input of the optimizing unit.

9. The apparatus according to claim 7 or 8, characterized in that each measuring point (M1, M2, M3) comprises a measuring coil, having an exciter current pulse generator which includes a memory, programmed by a computer, which generates chronologically short pulses of predeterminable frequency (amplitude and phase) spectrum, which are changeable in length and shape.

10. The apparatus according to claim 7, characterized in that the optimizing unit comprises an analyzer for each signal applied to the control input thereof for comparing the signal with a predeterminable desired value, as well as a corrector for changing the parameters of the measuring pulses at the final thickness measuring point (M3) by means of signals obtained from the results of the analysis.

11. The apparatus according to claim 7, characterized in that the optimizing unit comprises a computer.

12. The apparatus according to claim 7, characterized in that the apparatus further comprises a correction unit after the final thickness measuring point (M3) for generating correction signals for the processing means.

13. The apparatus according to claim 7, characterized in that said apparatus further comprises a recording and/or memory unit for receiving data from said final thickness determining means.

* * * * *